United States Patent
Nakamura

(10) Patent No.: US 12,547,762 B2
(45) Date of Patent: Feb. 10, 2026

(54) PERSONAL INFORMATION PROTECTION DEVICE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 217 days.

(21) Appl. No.: 18/312,176

(22) Filed: May 4, 2023

(65) Prior Publication Data

US 2023/0394171 A1 Dec. 7, 2023

(30) Foreign Application Priority Data

Jun. 5, 2022 (JP) .................................. 2022-091244

(51) Int. Cl.
*G06F 21/62* (2013.01)
*G06F 21/14* (2013.01)

(52) U.S. Cl.
CPC .......... *G06F 21/6245* (2013.01); *G06F 21/14* (2013.01)

(58) Field of Classification Search
CPC ... G06F 21/6245; G06F 21/14; G06F 21/6254
See application file for complete search history.

(56) References Cited

U.S. PATENT DOCUMENTS

| | | | |
|---|---|---|---|
| 11,442,926 B2* | 9/2022 | Jo ........................ | G06F 21/6218 |
| 11,522,958 B1* | 12/2022 | Pope ........................ | H04L 67/12 |
| 11,748,510 B1* | 9/2023 | Beveridge ........... | G06F 21/6245 726/27 |
| 2006/0092043 A1* | 5/2006 | Lagassey ............ | G07C 5/0891 340/907 |
| 2013/0019111 A1* | 1/2013 | Martin .................... | G06F 21/62 713/193 |
| 2016/0366364 A1* | 12/2016 | Fechner ................. | H04N 5/772 |
| 2017/0228410 A1* | 8/2017 | Slusar ..................... | G06F 21/00 |
| 2020/0043260 A1* | 2/2020 | Yamada .................. | G07C 5/00 |
| 2021/0271413 A1* | 9/2021 | Herzogenrath ....... | G06F 3/0679 |
| 2022/0107929 A1* | 4/2022 | Falco .................. | G06F 16/2255 |
| 2022/0289250 A1* | 9/2022 | Oba ........................ | G08G 1/16 |
| 2023/0379430 A1* | 11/2023 | Han ..................... | H04N 23/667 |

FOREIGN PATENT DOCUMENTS

| | | | |
|---|---|---|---|
| CN | 113765996 A | * | 12/2021 |
| JP | 2009-157554 A | | 7/2009 |

* cited by examiner

*Primary Examiner* — Lynn D Feild
*Assistant Examiner* — Ethan V Vo
(74) *Attorney, Agent, or Firm* — Rimon P.C.

(57) ABSTRACT

A personal information protection device to be applied to a vehicle includes a state detector, a data receiver, and a data processor. The state detector detects state data including a state of an occupant or an inside of a vehicle compartment. The data receiver acquires the state data from the state detector. The data processor executes processing on the state data. The data processor: obfuscates the state data, and saves the state data obfuscated in a first memory; upon acquiring first trigger information related to prediction information on an accident involving the vehicle, encrypts the obfuscated state data saved in the first memory, and saves the state data encrypted in a second memory; and, upon acquiring second trigger information related to prediction information or occurrence information on an accident involving the vehicle, starts a process of storing the encrypted state data in a third memory.

5 Claims, 6 Drawing Sheets

PERSONAL INFORMATION PROTECTION DEVICE

CROSS-REFERENCE TO RELATED APPLICATIONS

The present application claims priority from Japanese Patent Application No. 2022-091244 filed on Jun. 5, 2022, the entire contents of which are hereby incorporated by reference.

BACKGROUND

The disclosure relates to a personal information protection device.

Recent years have seen operation of, for example, a device that monitors a behavior, a facial expression, or a body condition including a health condition of an occupant of a vehicle, based on image information regarding the occupant of the vehicle obtained by an imaging device, and executes driving control on the vehicle, or transmits information to a suitable institution when the occupant has a poor health condition.

In addition, for example, as a way to identify a cause of an accident, a drive recording system that saves images of surroundings of a vehicle and the inside of a vehicle compartment has also been widely used under recent social circumstances.

The devices described above are both useful. However, for example, when an event such as a contact accident involving a vehicle occurs, image information remains in a state of being viewable by anyone, which causes a risk of leakage of personal information.

To cope with such a risk, disclosed is, for example, a device including: a contact detector that detects occurrence or a high possibility of occurrence of contact; a first video storage in which, upon detection of occurrence or a high possibility of occurrence of contact, video captured with a camera around the time of detection is saved; a first transmitter that wirelessly transmits an imaging request signal upon detection of occurrence or a high possibility of occurrence of contact; a first receiver that receives an imaging request signal; a second video storage in which, upon reception of an imaging request signal, video captured with the camera around the time of reception and encrypted is saved; a second transmitter that wirelessly transmits encrypted video; a second receiver that receives encrypted video; and a third video storage in which, upon reception of encrypted video, the encrypted video is saved. Reference is made to Japanese Unexamined Patent Application Publication No. 2009-157554, for example.

SUMMARY

An aspect of the disclosure provides a personal information protection device to be applied to a vehicle. The personal information protection device includes a state detector, a data receiver, and a data processor. The state detector is configured to detect state data including a state of an occupant of the vehicle or an inside of a vehicle compartment of the vehicle. The data receiver is configured to acquire the state data from the state detector. The data processor is configured to execute processing on the state data. The data processor includes one or more processors and one or more memories communicably coupled to the one or more processors. The one or more memories include a first memory, a second memory, and a third memory. The one or more processors are configured to: obfuscate the state data, and save the state data obfuscated in the first memory; upon acquiring first trigger information related to prediction information on an accident involving the vehicle, encrypt the obfuscated state data saved in the first memory, and save the state data encrypted in the second memory; and upon acquiring second trigger information related to prediction information or occurrence information on an accident involving the vehicle, start a process of storing the encrypted state data in the third memory.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
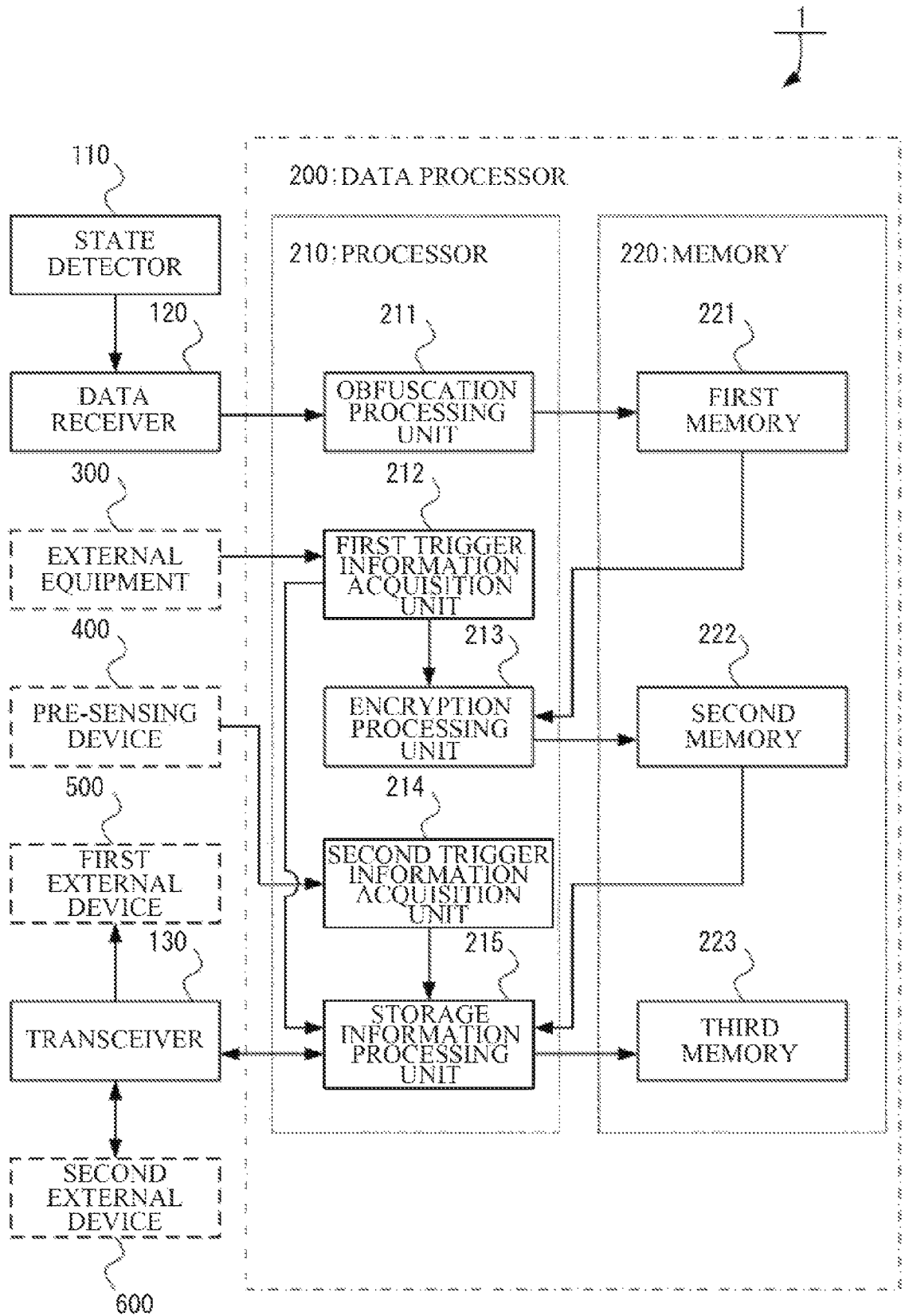
FIG. 1 is a diagram illustrating a configuration of a personal information protection device according to one example embodiment of the disclosure.

Image information has a large amount of data in the first place. Thus, in consideration of a factor such as a memory capacity, an appropriate process is to execute encryption after compressing (i.e., obfuscating) video information. However, this process imposes great processing load, which makes it difficult to process image information at the time of occurrence of an accident in real time, while protecting personal information.

It is desirable to provide a personal information protection device that is able to save encrypted image information regarding an occupant at appropriate timing.

In the following, some example embodiments of the disclosure are described in detail with reference to FIGS. 1 to 6. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A personal information protection device 1 according to a first example embodiment will now be described with reference to FIGS. 1 and 2.

[Configuration of Personal Information Protection Device 1]

As illustrated in FIG. 1, the personal information protection device 1 according to the example embodiment may include a state detector 110, a data receiver 120, a transceiver 130, and a data processor 200.

The state detector 110 detects a state of an occupant of an own vehicle or the inside of a vehicle compartment of the own vehicle.

In one example, the state detector 110 may capture an image of the occupant or the inside of the vehicle compartment, by means of an imaging device provided in a front part inside the vehicle compartment.

Image information captured by the state detector 110 may be supplied, as image data serving as state data, to the data receiver 120 to be described later.

Note that the "state data" may refer to captured image data representing the state of the occupant or the inside of the vehicle compartment.

The data receiver 120 acquires state data from the state detector 110.

The data receiver 120 may sequentially supply the state data acquired from the state detector 110 to the data processor 200 to be described later.

The transceiver 130 may transmit encrypted data stored in a third memory 223 to be described later to a first external device 500. In one example, the transceiver 130 may transmit encrypted state data stored in the third memory 223 to the first external device 500, after a second trigger information acquisition unit 214 to be described later in the data processor 200 acquires, as second trigger information, accident prediction information or accident occurrence information related to an accident involving the own vehicle.

Examples of the first external device 500 may include a predetermined specific external device, such as a server or another device in a system that copes with an emergency situation.

In addition, upon reception of a data transmission request from a second external device 600 different from the first external device 500, the transceiver 130 may transmit encrypted state data stored in the third memory 223 to the second external device 600, after the second trigger information acquisition unit 214 to be described later in the data processor 200 acquires, as the second trigger information, accident prediction information or accident occurrence information related to an accident involving the own vehicle.

Examples of the second external device 600 may include a device of an institution such as a hospital, the police, or a fire station, and a server or another device in a system that performs malfunction diagnosis on the own vehicle.

The data processor 200 includes a processor 210 and a memory 220.

The processor 210 may include an obfuscation processing unit 211, a first trigger information acquisition unit 212, an encryption processing unit 213, the second trigger information acquisition unit 214, and a storage information processing unit 215.

Furthermore, the memory 220 includes a first memory 221, a second memory 222, and the third memory 223.

The obfuscation processing unit 211 may perform compression processing on state data supplied from the data receiver 120 to obfuscate the data. The state data obfuscated by the obfuscation processing unit 211 may be saved in the first memory 221. Examples of a compression method may include run-length encoding, area image compression, predictive coding, entropy coding, an adaptive dictionary algorithm such as LZW, Deflate, and a chain code.

The first trigger information acquisition unit 212 may acquire, as first trigger information, accident occurrence prediction information from external equipment 300 such as an occupant monitoring system (e.g., a driver monitoring system (DMS)) or an advanced driver-assistance system (ADAS), a pre-sensing device 400, or other equipment. When the first trigger information acquisition unit 212 acquires accident occurrence prediction information, the encryption processing unit 213 to be described later may be notified of the acquisition, and the encryption processing unit 213 may be activated.

The encryption processing unit 213 may execute a process of encrypting obfuscated state data saved in the first memory 221. The state data encrypted by the encryption processing unit 213 may be saved in the second memory 222. Examples of cryptography may include common key cryptography (i.e., secret key cryptography) such as Data Encryption Standard (DES), Rivest Cipher 4 (RC4), or Advanced Encryption Standard (AES), and public key cryptography such as RSA or elliptic curve cryptography.

The second trigger information acquisition unit 214 may acquire accident occurrence prediction information or accident occurrence information. In one example, when accident occurrence prediction information from a DMS is the first trigger information, accident occurrence prediction information from a device such as an ADAS or the pre-sensing device 400 or accident occurrence information from a device such as a contact detection sensor may serve as the second trigger information. When accident occurrence prediction information from an ADAS is the first trigger information, accident occurrence prediction information from a device such as the pre-sensing device 400 or accident occurrence information from a device such as a contact detection sensor may serve as the second trigger information. When accident occurrence prediction information from a device such as the pre-sensing device 400 is the first trigger information, accident occurrence information from a device such as a contact detection sensor may serve as the second trigger information.

When the second trigger information acquisition unit 214 acquires accident occurrence prediction information or accident occurrence information, the storage information processing unit 215 to be described later may be notified of the acquisition.

When the storage information processing unit 215 is notified by the second trigger information acquisition unit 214 that accident occurrence prediction information or accident occurrence information serving as the second trigger information has been acquired, the storage information processing unit 215 may read a portion or all of encrypted state data saved in the second memory 222, and store the read data in the third memory 223.

Note that examples of the first memory 221 and the second memory 222 may include a random access memory (RAM), and examples of the third memory 223 may include a NAND flash memory.

[Processing by Personal Information Protection Device 1]

Processing by the personal information protection device 1 according to the example embodiment will now be described with reference to FIG. 2.

Figure 2:
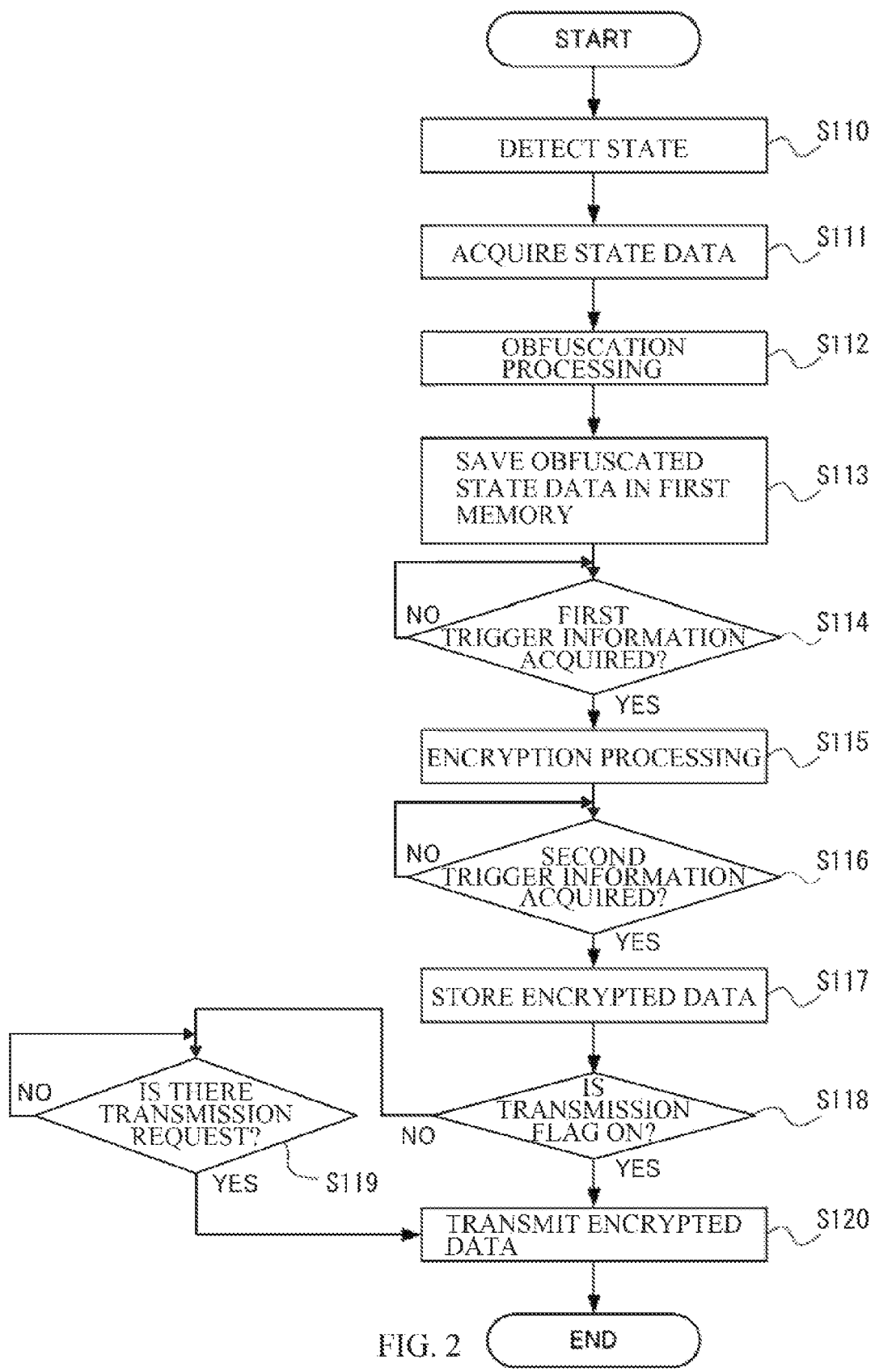
FIG. 2 is a diagram illustrating a processing flow of the personal information protection device according to one example embodiment of the disclosure.

As illustrated in FIG. 2, to detect the state of the occupant or the inside of the vehicle compartment, the state detector 110 may capture an image of the occupant or the inside of the vehicle compartment (step S110), and supply captured state data to the data receiver 120. The data receiver 120 may be supplied with the state data from the state detector 110, and supply the state data to the obfuscation processing unit 211 (step S111).

The obfuscation processing unit 211 may perform compression processing on the state data supplied from the data receiver 120 to obfuscate the data (step S112), and save the obfuscated state data in the first memory 221 (step S113).

The processor 210 may determine whether the first trigger information acquisition unit 212 has acquired the first trigger information (step S114). If the processor 210 determines that the first trigger information acquisition unit 212 has acquired no first trigger information (step S114: "NO"), the processor 210 may cause the processing to return, and transition to a standby mode.

If the processor 210 determines that the first trigger information acquisition unit 212 has acquired the first trigger information (step S114: "YES"), the processor 210 may notify the encryption processing unit 213 of the acquisition.

The encryption processing unit 213 may read the obfuscated state data from the first memory 221, execute encryption processing, and save the encrypted state data in the second memory 222 (step S115).

The processor 210 may determine whether the second trigger information acquisition unit 214 has acquired the second trigger information (step S116). If the processor 210 determines that the second trigger information acquisition unit 214 has acquired no second trigger information (step S116: "NO"), the processor 210 may cause the processing to return, and transition to the standby mode.

If the processor 210 determines that the second trigger information acquisition unit 214 has acquired the second trigger information (step S116: "YES"), the processor 210 may cause the storage information processing unit 215 to read a portion or all of the encrypted state data saved in the second memory 222, and store the read data in the third memory 223 (step S117).

Thereafter, the processor 210 may check a transmission flag (step S118). To the first external device 500 serving as a specific external device for which the transmission flag is on (step S118: "YES"), the processor 210 may cause the transceiver 130 to transmit the encrypted state data stored in the third memory 223 (step S120).

If the transmission flag is not on (step S118: "NO"), the processor 210 may determine whether there is a transmission request (step S119). If there is a transmission request (step S119: "YES"), the processor 210 may cause the transceiver 130 to transmit the encrypted state data stored in the third memory 223 to the second external device 600 serving as another external device (step S120).

Upon determining that there is no transmission request (step S119: "NO"), the processor 210 may cause the processing to return, and transition to the standby mode.

[Working and Effects]

As described above, the processor 210 of the data processor 200 in the personal information protection device 1 according to the example embodiment causes the obfuscation processing unit 211 to obfuscate state data acquired by the data receiver 120 from the state detector 110, and saves the obfuscated state data in the first memory 221. When the first trigger information acquisition unit 212 acquires prediction information related to an accident involving the own vehicle as the first trigger information, the processor 210 causes the encryption processing unit 213 to encrypt the obfuscated state data saved in the first memory 221, and saves the encrypted state data in the second memory 222. Furthermore, when the second trigger information acquisition unit 214 acquires prediction information or occurrence information related to an accident involving the own vehicle as the second trigger information, the processor 210 starts a process of storing the encrypted state data in the third memory 223.

In other words, the processor 210 of the data processor 200 in the personal information protection device 1 obfuscates state data acquired by the data receiver 120 from the state detector 110, encrypts the obfuscated state data, and stores the resulting data in the third memory 223.

This makes it possible to sufficiently protect the state data serving as personal information.

In addition, the processor 210 of the data processor 200 in the personal information protection device 1 may execute, in parallel, obfuscation processing on state data acquired by the data receiver 120 from the state detector 110 and encryption processing on obfuscated state data.

In other words, obfuscation processing on state data and encryption processing on obfuscated state data may be executed in a temporally distributed manner.

This makes it possible to shorten total processing time, and save the encrypted state data at appropriate timing.

In addition, used as the third memory 223 in which the encrypted state data is to be saved may be a memory such as a NAND flash memory that keeps a storage state with power turned off, is resistant to vibration and shock, and has high write and erase speeds while having a low read speed. This makes it possible to satisfy requirements related to appropriate protection of the state data serving as personal information.

When the first trigger information acquisition unit 212 acquires prediction information related to an accident involving the own vehicle as the first trigger information, the processor 210 of the data processor 200 in the personal information protection device 1 causes the encryption processing unit 213 to encrypt the obfuscated state data saved in the first memory 221, and saves the encrypted state data in the second memory 222.

Furthermore, when the second trigger information acquisition unit 214 acquires prediction information or occurrence information related to an accident involving the own vehicle as the second trigger information, the processor 210 starts the process of storing the encrypted state data in the third memory 223.

When accident occurrence prediction information from a DMS is the first trigger information, accident occurrence prediction information from a device such as an ADAS or the pre-sensing device 400 or accident occurrence information from a device such as a contact detection sensor may be used as the second trigger information. When accident occurrence prediction information from an ADAS is the first trigger information, accident occurrence prediction information from a device such as the pre-sensing device 400 or accident occurrence information from a device such as a contact detection sensor may be used as the second trigger information. When accident occurrence prediction information from a device such as the pre-sensing device 400 is the first trigger information, accident occurrence information from a device such as a contact detection sensor may be used as the second trigger information. This makes it possible to execute the process of storing the encrypted state data in the third memory 223 at appropriate timing.

The personal information protection device 1 according to the example embodiment may include the transceiver 130 that transmits the encrypted state data stored in the third memory 223 to the first external device 500. The processor 210 may cause the transceiver 130 to transmit the encrypted state data stored in the third memory 223 to the first external device 500, after the second trigger information acquisition unit 214 acquires prediction information or occurrence information related to an accident involving the own vehicle as the second trigger information.

This makes it possible to quickly transmit a situation or a state of the occupant around the time of occurrence of an accident to a predetermined specific external device, while appropriately concealing the state data including personal information.

When the transceiver 130 receives a data transmission request from the second external device 600, the processor 210 of the personal information protection device 1 according to the example embodiment may cause the transceiver 130 to transmit the encrypted state data stored in the third memory 223 to the second external device 600, after prediction information or occurrence information related to an accident involving the own vehicle is acquired.

This makes it possible to quickly transmit a situation or a state of the occupant around the time of occurrence of an accident to a predetermined specific external device, in response to a request, while appropriately concealing the state data including personal information.

Thus, for example, if the second external device 600 is a device of a hospital, quickly grasping a situation or a state of the occupant around the time of occurrence of an accident makes it possible to speedily prepare for treatment on the occupant.

Modification Example 1

The example embodiment gives a device of an institution such as a hospital as an example of the second external device 600. Alternatively, the second external device 600 may be, for example, a device such as a server that centrally controls a system in which various objects including vehicles and features are coupled via a network.

In this case, the device such as a server may acquire the encrypted state data. This makes it possible to grasp the scale or degree of an accident, and speedily provide appropriate information to another vehicle traveling nearby, while appropriately protecting personal information.

In addition, when information before an accident is included, it is possible to identify a cause of the accident afterward based on a behavior of the vehicle before the accident.

If information is acquirable before occurrence of an accident and a cause of the accident is a malfunction of the vehicle, it is expected to be possible to prevent occurrence of the accident beforehand by a remote operation.

Modification Example 2

The example embodiment describes that the state detector 110 simply captures an image of the occupant or the inside of the vehicle compartment. Alternatively, when the state detector 110 is configured to encrypt and transmit a captured image, this operation may be used. In this case, the data receiver 120 or the obfuscation processing unit 211 in the data processor 200 is to be additionally configured to decode a captured image encrypted by the state detector 110. However, encryption of data that has been transmitted without being subjected to encryption processing from the state detector 110 to the data receiver 120 and from the data receiver 120 to the obfuscation processing unit 211 makes it possible to further expand protection of personal information. This configuration is useful, for example, in a system in which the state detector 110 is provided separately.

Second Example Embodiment

A personal information protection device 1A according to a second example embodiment will now be described with reference to FIGS. 3 and 4.

[Configuration of Personal Information Protection Device 1A]

Figure 3:
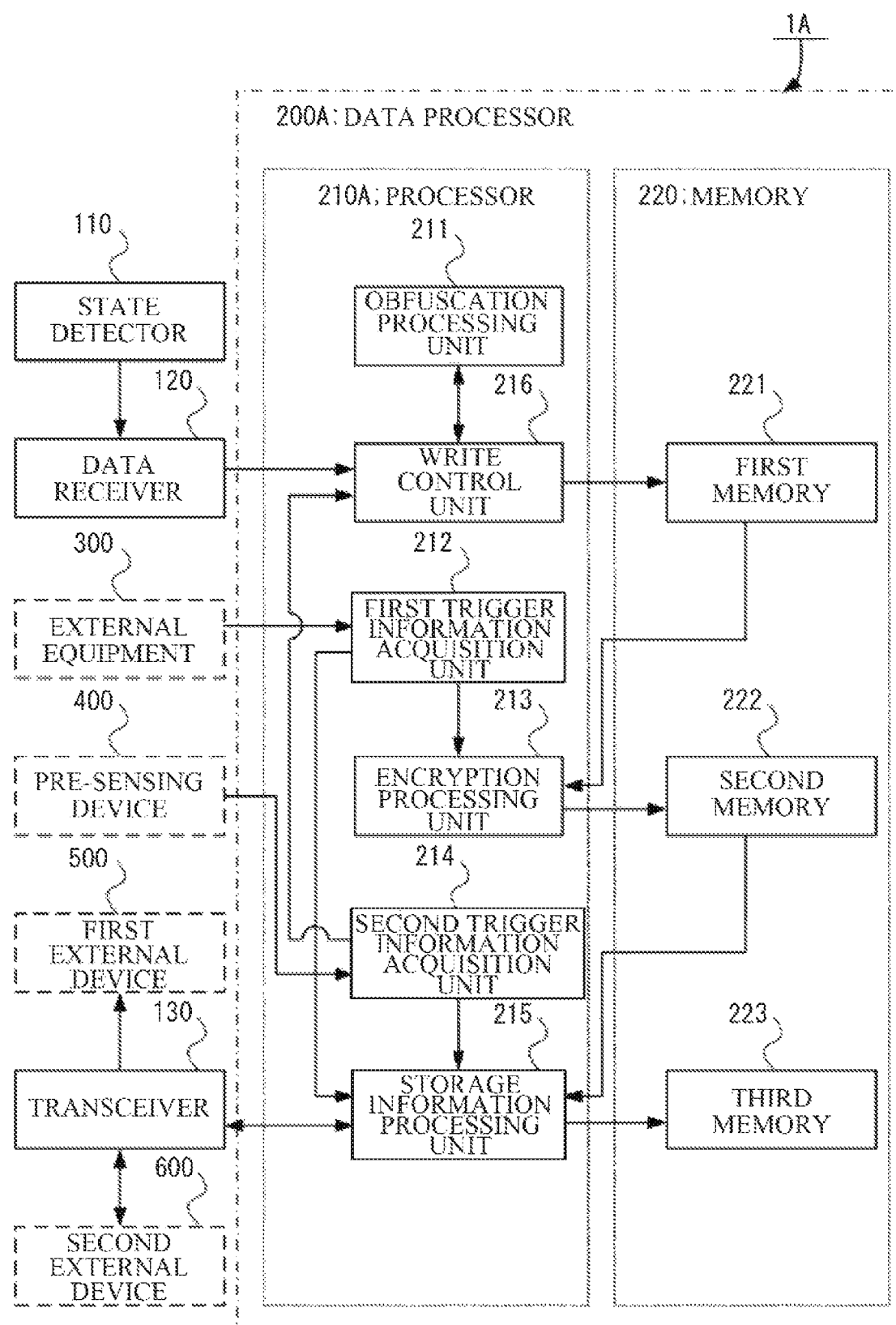
FIG. 3 is a diagram illustrating a configuration of a personal information protection device according to one example embodiment of the disclosure.

As illustrated in FIG. 3, the personal information protection device 1A according to the example embodiment may include the state detector 110, the data receiver 120, the transceiver 130, and a data processor 200A.

Note that components having configurations similar to those of the components in the first example embodiment are denoted with the same reference numerals without redundant description.

The data processor 200A includes a processor 210A and the memory 220.

The processor 210A may include the obfuscation processing unit 211, the first trigger information acquisition unit 212, the encryption processing unit 213, the second trigger information acquisition unit 214, the storage information processing unit 215, and a write control unit 216.

Furthermore, the memory 220 includes the first memory 221, the second memory 222, and the third memory 223.

When the second trigger information acquisition unit 214 acquires prediction information or occurrence information related to an accident involving the own vehicle serving as the second trigger information, the write control unit 216 may disable writing of newly obfuscated state data into the first memory 221.

[Processing by Personal Information Protection Device 1A]

Processing by the personal information protection device 1A according to the example embodiment will now be described with reference to FIG. 4.

Figure 4:
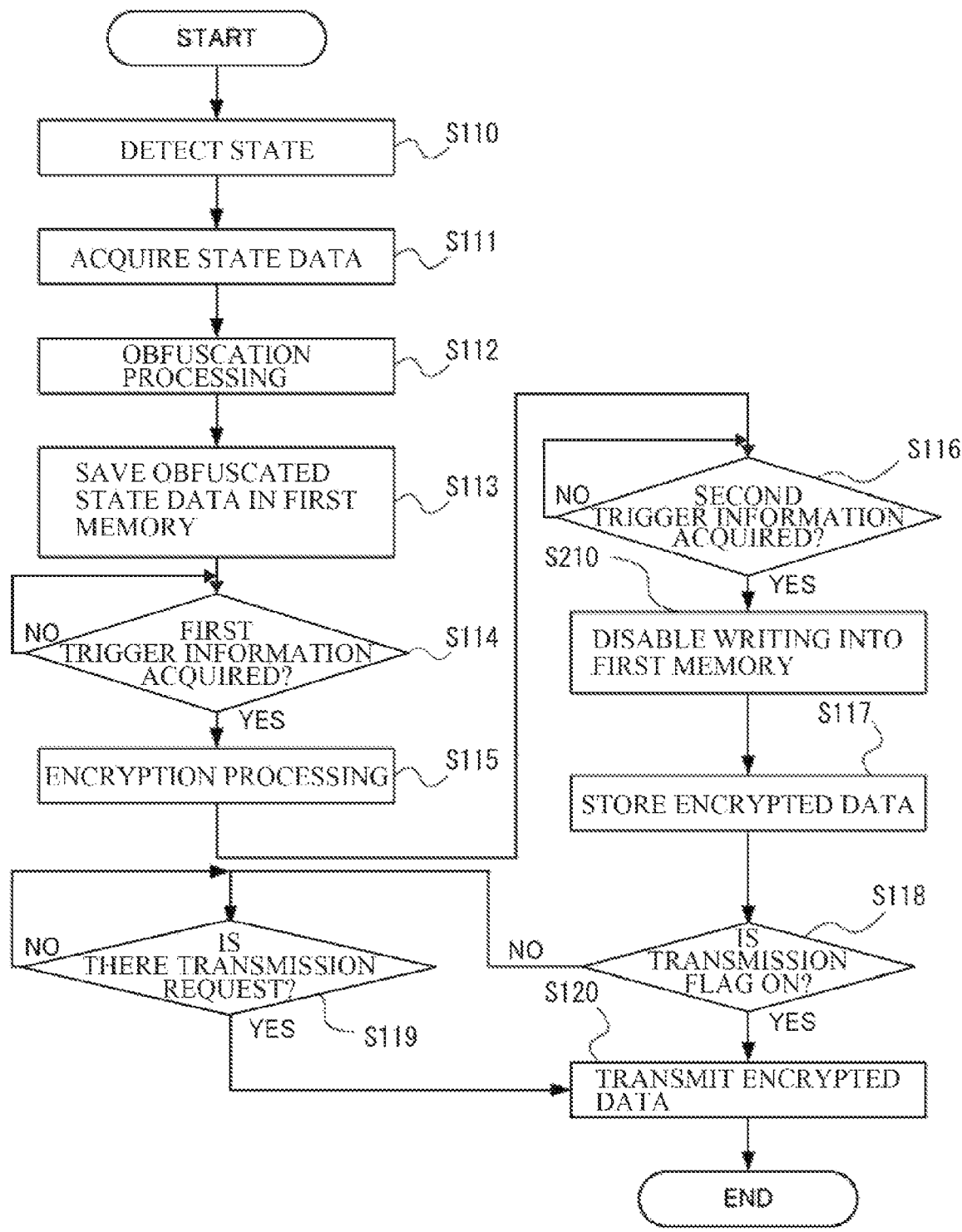
FIG. 4 is a diagram illustrating a processing flow of the personal information protection device according to one example embodiment of the disclosure.

As illustrated in FIG. 4, to detect the state of the occupant or the inside of the vehicle compartment, the state detector 110 may capture an image of the occupant or the inside of the vehicle compartment (step S110), and supply captured state data to the data receiver 120. The data receiver 120 may be supplied with the state data from the state detector 110, and supply the state data to the obfuscation processing unit 211 (step S111).

The obfuscation processing unit 211 may perform compression processing on the state data supplied from the data receiver 120 to obfuscate the data (step S112), and save the obfuscated state data in the first memory 221 (step S113).

The processor 210A may determine whether the first trigger information acquisition unit 212 has acquired the first trigger information (step S114). If the processor 210A determines that the first trigger information acquisition unit 212 has acquired no first trigger information (step S114: "NO"), the processor 210A may cause the processing to return, and transition to a standby mode.

If the processor 210A determines that the first trigger information acquisition unit 212 has acquired the first trigger information (step S114: "YES"), the processor 210A may notify the encryption processing unit 213 of the acquisition.

The encryption processing unit 213 may read the obfuscated state data from the first memory 221, execute encryption processing, and save the encrypted state data in the second memory 222 (step S115).

The processor 210A may determine whether the second trigger information acquisition unit 214 has acquired the second trigger information (step S116). If the processor 210A determines that the second trigger information acquisition unit 214 has acquired no second trigger information (step S116: "NO"), the processor 210A may cause the processing to return, and transition to the standby mode.

If the processor 210A determines that the second trigger information acquisition unit 214 has acquired the second trigger information (step S116: "YES"), the processor 210A may cause the write control unit 216 to disable writing of newly obfuscated state data into the first memory 221 (step S210).

Thereafter, the processor 210A may cause the storage information processing unit 215 to read a portion or all of the encrypted state data saved in the second memory 222, and store the read data in the third memory 223 (step S117).

Thereafter, the processor 210A may check a transmission flag (step S118). To the first external device 500 serving as a specific external device for which the transmission flag is on (step S118: "YES"), the processor 210A may cause the transceiver 130 to transmit the encrypted state data stored in the third memory 223 (step S120).

If the transmission flag is not on (step S118: "NO"), the processor 210A may determine whether there is a transmission request (step S119). If there is a transmission request (step S119: "YES"), the processor 210A may cause the transceiver 130 to transmit the encrypted state data stored in the third memory 223 to the second external device 600 serving as another external device (step S120).

Upon determining that there is no transmission request (step S119: "NO"), the processor 210A may cause the processing to return, and transition to the standby mode.

[Working and Effects]

As described above, when the second trigger information acquisition unit 214 acquires prediction information or occurrence information related to an accident involving the own vehicle serving as the second trigger information, the processor 210A of the personal information protection device 1A according to the example embodiment may cause the write control unit 216 to disable writing of newly obfuscated state data into the first memory 221.

In other words, when importance is placed on information before occurrence of an accident involving the own vehicle, it is possible to prevent rewriting of information into the first memory 221 by the processing described above, which makes it possible to appropriately save only necessary information.

Third Example Embodiment

A personal information protection device 1B according to a third example embodiment will now be described with reference to FIGS. 5 and 6.

[Configuration of Personal Information Protection Device 1B]

Figure 5:
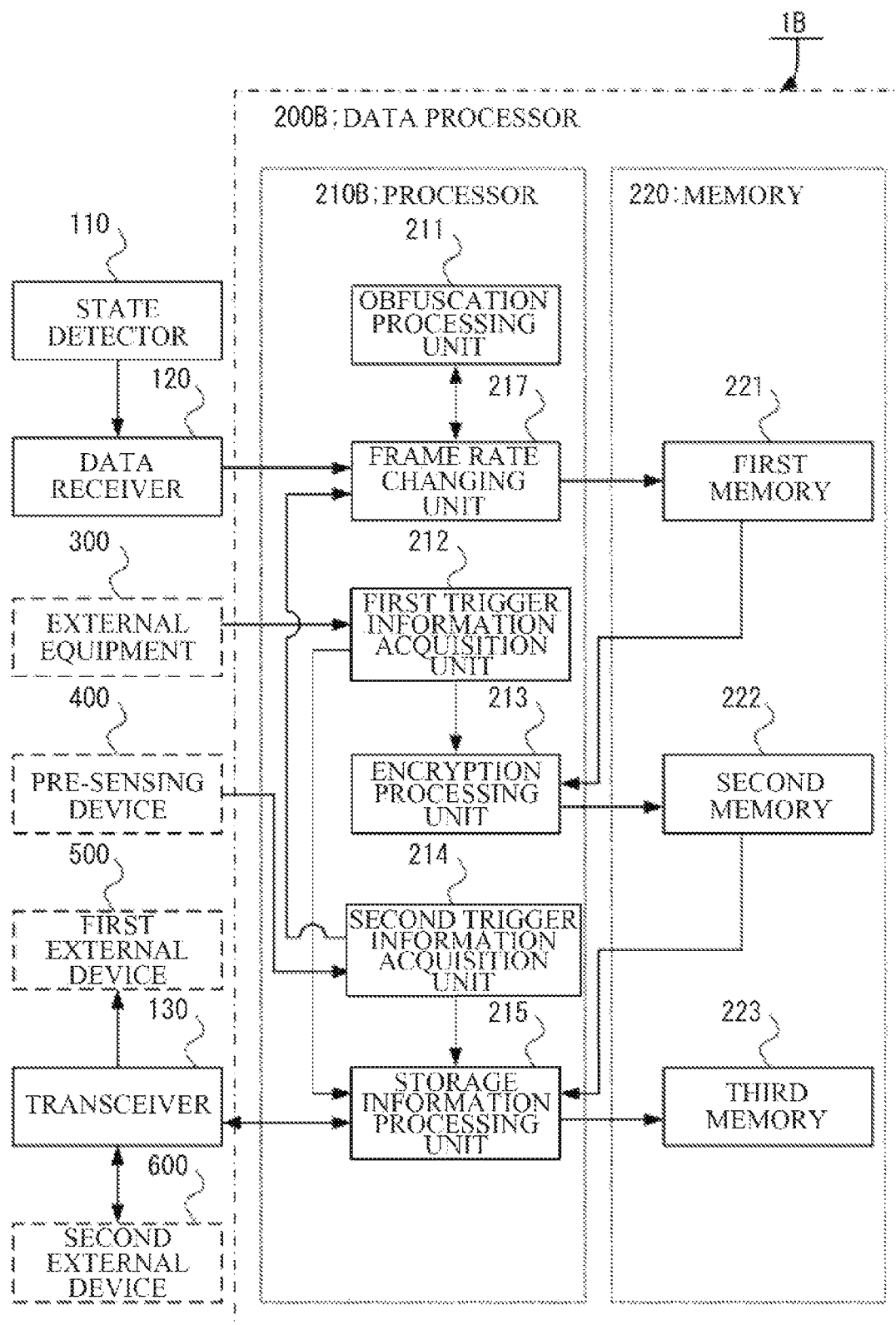
FIG. 5 is a diagram illustrating a configuration of a personal information protection device according to one example embodiment of the disclosure.

As illustrated in FIG. 5, the personal information protection device 1B according to the example embodiment may include the state detector 110, the data receiver 120, the transceiver 130, and a data processor 200B.

Note that components having configurations similar to those of the components in the first example embodiment and the second example embodiment are denoted with the same reference numerals without redundant description.

The data processor 200B includes a processor 210B and the memory 220.

The processor 210B may include the obfuscation processing unit 211, the first trigger information acquisition unit 212, the encryption processing unit 213, the second trigger information acquisition unit 214, the storage information processing unit 215, and a frame rate changing unit 217.

Furthermore, the memory 220 includes the first memory 221, the second memory 222, and the third memory 223.

When the second trigger information acquisition unit 214 acquires prediction information or occurrence information related to an accident involving the own vehicle serving as the second trigger information, the frame rate changing unit 217 may change a frame rate to reduce a frequency of writing newly obfuscated state data into the first memory 221.

[Processing by Personal Information Protection Device 1B]

Processing by the personal information protection device 1B according to the example embodiment will now be described with reference to FIG. 6.

Figure 6:
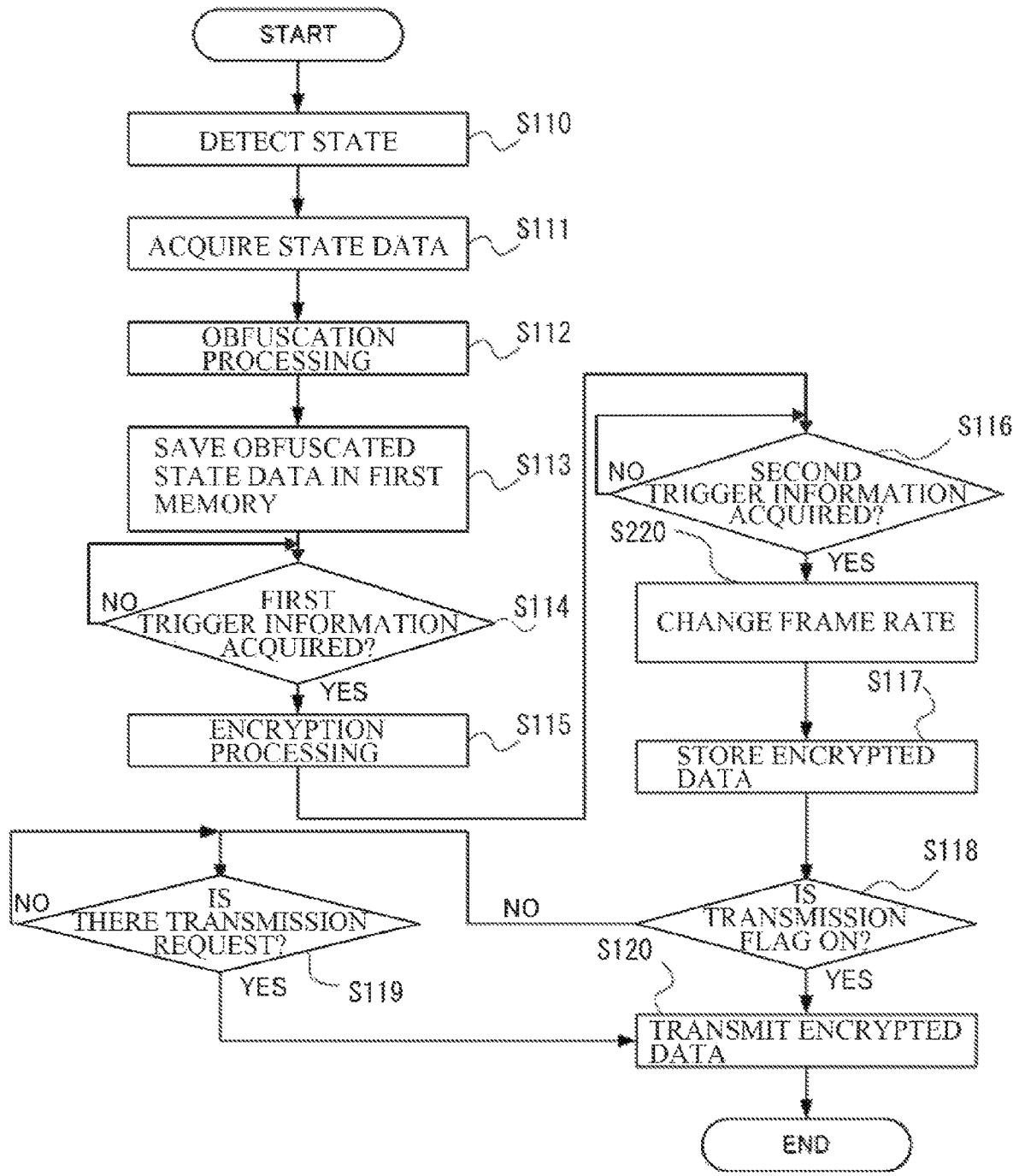
FIG. 6 is a diagram illustrating a processing flow of the personal information protection device according to one example embodiment of the disclosure.

As illustrated in FIG. 6, to detect the state of the occupant or the inside of the vehicle compartment, the state detector 110 may capture an image of the occupant or the inside of the vehicle compartment (step S110), and supply captured state data to the data receiver 120. The data receiver 120 may be supplied with the state data from the state detector 110, and supply the state data to the obfuscation processing unit 211 (step S111).

The obfuscation processing unit 211 may perform compression processing on the state data supplied from the data receiver 120 to obfuscate the data (step S112), and save the obfuscated state data in the first memory 221 (step S113).

The processor 210B may determine whether the first trigger information acquisition unit 212 has acquired the first trigger information (step S114). If the processor 210B determines that the first trigger information acquisition unit 212 has acquired no first trigger information (step S114: "NO"), the processor 210B may cause the processing to return, and transition to a standby mode.

If the processor 210B determines that the first trigger information acquisition unit 212 has acquired the first trigger information (step S114: "YES"), the processor 210B may notify the encryption processing unit 213 of the acquisition.

The encryption processing unit 213 may read the obfuscated state data from the first memory 221, execute encryption processing, and save the encrypted state data in the second memory 222 (step S115).

The processor 210B may determine whether the second trigger information acquisition unit 214 has acquired the second trigger information (step S116). If the processor 210B determines that the second trigger information acquisition unit 214 has acquired no second trigger information (step S116: "NO"), the processor 210B may cause the processing to return, and transition to the standby mode.

If the processor 210B determines that the second trigger information acquisition unit 214 has acquired the second trigger information (step S116: "YES"), the processor 210B may cause the frame rate changing unit 217 to change the frame rate to reduce the frequency of writing newly obfuscated state data into the first memory 221 (step S220).

Thereafter, the processor 210B may cause the storage information processing unit 215 to read a portion or all of the encrypted state data saved in the second memory 222, and store the read data in the third memory 223 (step S117).

Thereafter, the processor 210B may check a transmission flag (step S118). To the first external device 500 serving as a specific external device for which the transmission flag is on (step S118: "YES"), the processor 210B may cause the transceiver 130 to transmit the encrypted state data stored in the third memory 223 (step S120).

If the transmission flag is not on (step S118: "NO"), the processor 210B may determine whether there is a transmission request (step S119). If there is a transmission request (step S119: "YES"), the processor 210B may cause the transceiver 130 to transmit the encrypted state data stored in the third memory 223 to the second external device 600 serving as another external device (step S120).

Upon determining that there is no transmission request (step S119: "NO"), the processor 210B may cause the processing to return, and transition to the standby mode.

[Working and Effects]

As described above, when the second trigger information acquisition unit 214 acquires prediction information or occurrence information related to an accident involving the own vehicle serving as the second trigger information, the processor 210B of the personal information protection device 1B according to the example embodiment may cause the frame rate changing unit 217 to change the frame rate to reduce the frequency of writing newly obfuscated state data into the first memory 221.

In other words, when importance is placed on information after occurrence of an accident involving the own vehicle, the frame rate may be changed to reduce the frequency of writing of newly obfuscated state data into the first memory 221, by the processing described above, when the second trigger information acquisition unit 214 acquires prediction information or occurrence information related to an accident involving the own vehicle serving as the second trigger information. This makes it possible to save information after occurrence of an accident involving the own vehicle for a longer time in the first memory 221.

Modification Example 3

The foregoing example embodiments describe examples in which, when the processor 210, 210A, or 210B determines that the second trigger information acquisition unit 214 has acquired the second trigger information, the processor 210, 210A, or 210B causes the storage information processing unit 215 to read a portion or all of the encrypted state data saved in the second memory 222, and store the read data in the third memory 223.

A portion of the encrypted state data saved in the second memory 222 to be read by the storage information processing unit 215 may be any state data group, such as the latest state data group written into the second memory 222 or a state data group originally written.

In this manner, it is possible to appropriately save only a specific state data group corresponding to an application, making it possible to reduce processing load.

Modification Example 4

The third example embodiment describes an example in which the frame rate changing unit 217 is provided to change the frame rate to reduce the frequency of writing newly obfuscated state data into the first memory 221, when the second trigger information acquisition unit 214 acquires prediction information or occurrence information related to an accident involving the own vehicle serving as the second trigger information.

However, this is for the purpose of reducing a volume of new data to be written into the first memory 221 when prediction information or occurrence information related to an accident involving the own vehicle is acquired. Accordingly, for example, in image clipping, the reduction may be achieved by a method such as reducing a clipping size.

In some embodiments, it is possible to implement the personal information protection device 1, 1A, or 1B of the example embodiment of the disclosure by recording the process to be executed by the processor 210, 210A, or 210B on a non-transitory recording medium readable by a computer system, and causing the computer system to load the program recorded on the non-transitory recording medium onto the processor 210, 210A, or 210B to execute the program. The computer system as used herein may encompass an operating system (OS) and a hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more embodiments of the disclosure, it is possible to appropriately save encrypted image information regarding an occupant at appropriate timing.

As used herein, the term "collision" may be used interchangeably with the term "contact".

Each of the data processors 200, 200A, and 200B illustrated in FIGS. 1, 3, and 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the data processors 200, 200A, and 200B. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the data processors 200, 200A, and 200B illustrated in FIGS. 1, 3, and 5.

The invention claimed is:

1. A personal information protection device to be applied to a vehicle, the personal information protection device comprising:
   a state detector configured to detect state data including a state of an occupant of the vehicle or a state of an inside of a vehicle compartment of the vehicle;
   a data processor configured to execute processing on the state data, wherein
      the data processor comprises one or more processors and one or more memories communicably coupled to the one or more processors, the one or more memories comprising a first memory, a second memory, and a third memory, and
      the one or more processors are coupled to a first sensor configured to generate first trigger information related to prediction information on an accident involving the vehicle, and coupled to a second sensor, different from the first sensor, configured to generate second trigger information related to occurrence information on an accident involving the vehicle, and are configured to:
      obfuscate the state data, and save the state data obfuscated in the first memory;
      upon acquiring the first trigger information from the first sensor, encrypt the obfuscated state data saved in the first memory, and save the state data encrypted in the second memory; and
      upon acquiring the second trigger information from the second sensor, start a process of storing the encrypted state data in the third memory; and
   a transceiver operatively connected only to the third memory and configured to transmit exclusively the encrypted state data stored in the third memory to any of external devices,
   wherein the first sensor is configured to generate the first trigger information prior to occurrence of an accident, and the second sensor is configured to generate the second trigger information upon detection of actual impact or crash, and
   wherein the encrypted state data stored in the second memory is retained within the personal information protection device, and only the encrypted state data stored in the third memory is made transmittable via the transceiver.

2. The personal information protection device according to claim 1, wherein the one or more processors are configured to, upon acquiring the second trigger information, disable writing of the state data newly obfuscated into the first memory.

3. The personal information protection device according to claim 1, wherein the one or more processors are configured to, upon acquiring the second trigger information, execute control of reducing a volume of new data to be written into the first memory.

4. The personal information protection device according to claim 1, wherein the one or more processors are configured to, after acquiring the second trigger information, cause the transceiver to transmit the encrypted state data stored in the third memory to a first external device of the external devices.

5. The personal information protection device according to claim 4, wherein the one or more processors are configured such that, when the transceiver receives a data transmission request from a second external device of the external devices other than the first external device of the external devices, the one or more processors cause, after acquiring the second trigger information, the transceiver to transmit the encrypted state data stored in the third memory to the second external device.

* * * * *